(12) United States Patent
Sauder

(10) Patent No.: US 7,532,811 B2
(45) Date of Patent: May 12, 2009

(54) SYSTEM AND METHOD FOR CAPTURING, ASSOCIATING AND DISTRIBUTING PHOTOGRAPHIC IMAGES

(76) Inventor: David Andrew Sauder, 329 High St., Santa Cruz, CA (US) 95060

( * ) Notice: Subject to any disclaimer, the term of this patent is extended or adjusted under 35 U.S.C. 154(b) by 368 days.

(21) Appl. No.: 11/180,174

(22) Filed: Jul. 13, 2005

(65) Prior Publication Data

US 2006/0013576 A1    Jan. 19, 2006

Related U.S. Application Data

(60) Provisional application No. 60/587,726, filed on Jul. 13, 2004.

(51) Int. Cl.
*G03B 17/00* (2006.01)
*H04N 5/232* (2006.01)

(52) U.S. Cl. ..................... 396/58; 348/211.2

(58) Field of Classification Search ............. 396/56, 396/58, 59, 321; 348/157, 211.99, 211.2, 348/211.3
See application file for complete search history.

(56) References Cited

U.S. PATENT DOCUMENTS

| | | | |
|---|---|---|---|
| 6,526,158 B1 * | 2/2003 | Goldberg | 382/115 |
| 6,608,563 B2 * | 8/2003 | Weston et al. | 340/573.1 |
| 6,624,845 B2 * | 9/2003 | Loyd et al. | 348/151 |
| 6,704,712 B1 | 3/2004 | Bleiweiss | |
| 6,803,887 B1 | 10/2004 | Lauper | |
| 6,812,824 B1 | 11/2004 | Goldinger | |
| 2002/0001468 A1 * | 1/2002 | Kaku | 396/310 |
| 2003/0182143 A1 | 9/2003 | Conrad et al. | 705/1 |
| 2004/0004663 A1 * | 1/2004 | Kahn et al. | 348/207.1 |

* cited by examiner

*Primary Examiner*—Melissa Jan Koval
(74) *Attorney, Agent, or Firm*—Patrick Reilly

(57) ABSTRACT

A system and method for capturing and distributing photographic images are provided. A wireless transmitter is physically coupled with a subject. The wireless transmitter broadcasts an identification code that is received by a wireless transceiver associated with a camera. One or more cameras capture visual images and associate at least one image with at least one wireless transmitter identification code. The image is stored as a record in a database and associated with one or more identification codes and a time/date stamp. The record is retrievable by reference to each associated identification code and optionally in reference to the time/date stamp. Records may be provided via the Internet or other electronic communications network, to include telephony systems. Records may be provided according to price schedules related to image quality, quantity, advertising content options.

19 Claims, 18 Drawing Sheets

| HEADER DATAFIELD 96A | IM ID CODE DATAFIELD 96B | IM TDS DATAFIELD 96C | GPS DATAFIELD 96D | IMAGE DATAFIELD 96E | PROVIDER DATAFIELD 96F | CAMERA DATAFIELD 96G | LOCATION DATAFIELD 96H | TAIL 96I |
|---|---|---|---|---|---|---|---|---|

Key Chain side Device (KSD)

Web Site Side

Figure 14A - Process Flow Chart
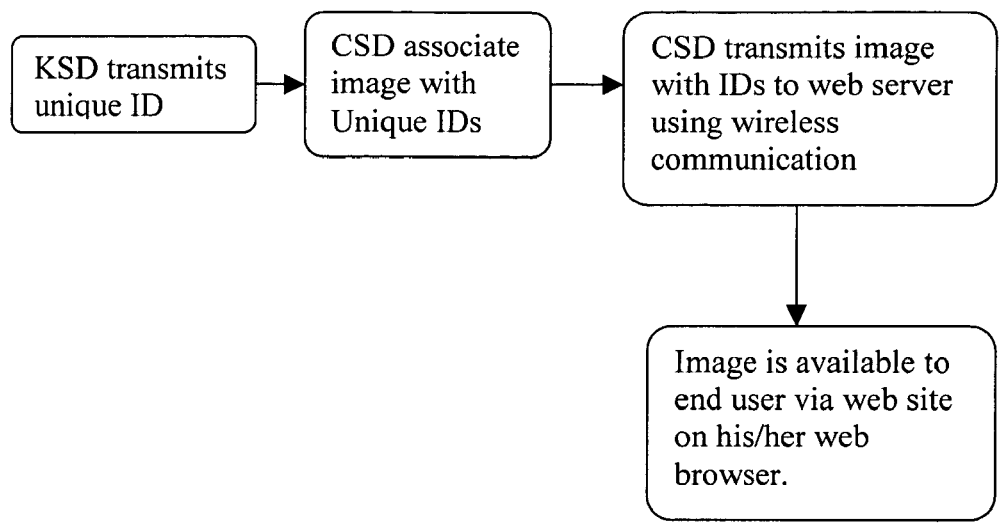

Figure 14B - Process Flow Chart
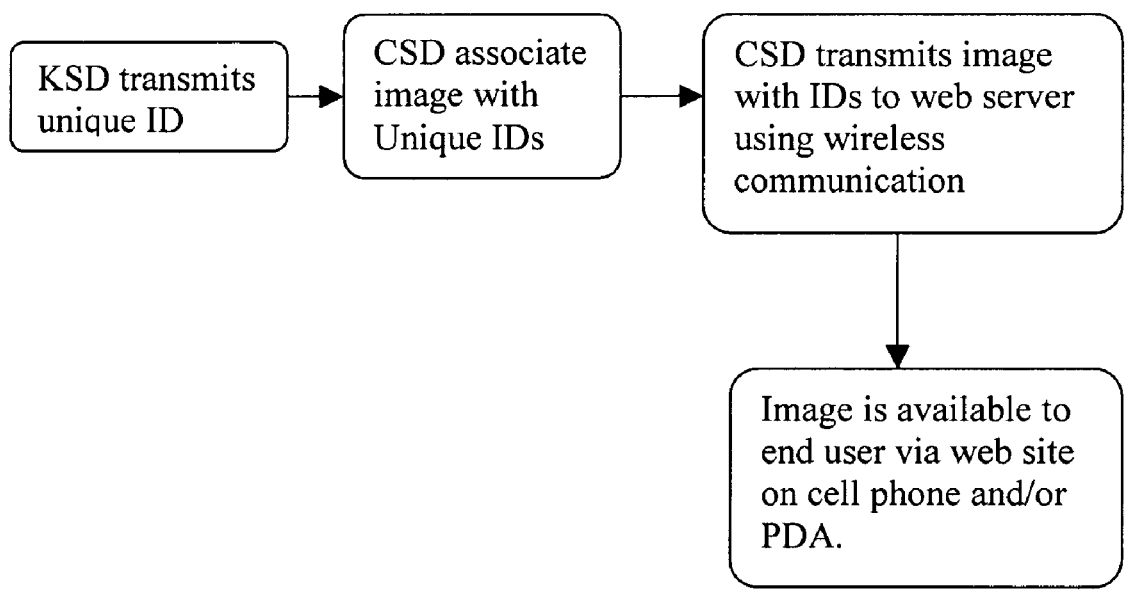

SYSTEM AND METHOD FOR CAPTURING, ASSOCIATING AND DISTRIBUTING PHOTOGRAPHIC IMAGES

RELATED APPLICATIONS

This present Non-Provisional U.S. Utility Patent Application is a Continuation-in-Part to U.S. Provisional Patent Application No. 60/587,726 which was filed on Jul. 13, 2004, and this present Non-Provisional U.S. Utility Patent Application does hereby claim the benefit of the priority date of the aforementioned U.S. Provisional Patent Application No. 60/587,726. The aforementioned U.S. Provisional Patent Application No. 60/587,726 is hereby incorporated by reference in its entirety herein and for all purposes in this Patent Application.

FIELD OF THE INVENTION

The Present Invention relates to electronic systems and methods for acquiring and distributing photographic images. More particularly, the Present Invention relates to methods and systems for generating and providing access to digital data files related to, or comprising, photographic images.

BACKGROUND OF THE INVENTION

Most consumers often enjoy viewing photographs of themselves, their friends and families engaged in athletic, leisure and recreational activities. The photographic instrument industry has consistently responded to this wide-spread desire by striving to design and manufacture photographic equipment that record quality photographs while placing minimal skill requirements on the operator of the camera. The increased sophistication of commercially available and modestly priced digital electronics cameras has created an expectation among the public that photography should be easily and reliably accomplished in any setting. In addition, the storage of photographic images in digital electronic media has satisfied a public appetite for easily acquiring and enabling the delivery and presentation of visual images.

The common use of the Internet to enable remote access to digital photographs has created a vibrant market in hassle-free photographic processing. In particular, vacationers and persons engaged in recreational activities often wish to have photographs of their activities recorded for later selection and publishing. Yet most people often do not wish to be responsible for taking photographs while performing athletic or athletic feats, such as surfing or playing tennis. There is therefore a long-felt need to enable consumer access to photographs of identifiable persons engaged in active pursuits, wherein the photographs are generated by equipment operated by third party agents or vendors.

SUMMARY OF THE INVENTION

Towards this object, and other objects that will become obvious in light of the Prior Art and the present disclosure, the Method of the Present Invention provides a method and system to generate and provide access to photographic images of persons, animals, other living entities and objects.

In a first preferred embodiment of the, the present invention provides a system and method for capturing and distributing photographic images. The basic system includes a portable wireless transmitter, a wireless receiver, a digital storage module and a camera. The wireless transmitter is associated with and transmits an identification code to the wireless receiver. The wireless receiver is configured to receive the identification code broadcast from the wireless transmitter. The digital storage module is coupled with the wireless receiver and stores the identification code record. The camera is communicatively coupled with the digital storage module. The camera captures photographic images, provides the photographic images to the digital storage module, and stores the photographic images in a record and associates the record with the identification code record, also incorporated into the storage module.

The invention further allows for a method and system to readily connect customers to their pictures or video. This technology can be used in many areas of everyday life but in one particular embodiment example provided herein is for the sports and recreation photography market. The invention will give skiers, snowboards, surfers, an many other sport or recreation customers, instant and easy access to his/her sport pictures or videos associated with a person, location or object, wherein the person place or object is associated with an identification code and photographic records. Additionally, the system and method can be sold to or used in the business sector where a business using this invention will receive a percentage of the cost of each photo sold. In other embodiments this invention can be expanded to many other general areas such as theme park photography, parent-child security safety, and extreme sport buddy tracking, etc. The many potential uses and possibilities are will be made relevant to one skilled in the art in light of this disclosure.

In a basic embodiment, this system and method comprise two elements of hardware, a key chain module, and a camera side module. The key chain module can be a small, battery operated, optionally weather proofed, wireless transmitter. The key chain module is assigned an identification number on a permanent or reprogrammable basis. The identification number may optionally be visually displayed on the outside of the key chain device. The key chain module may additionally be associated with a universal resource locator of a website or webpage of a website. The camera side module comprises a wireless receiver hardware configured to couple and communicate with the camera (e.g., as a camera's hot shoe) and with a digital memory storage module. The wireless receiver module may be configured to be compatible with one or a plurality of commercially available camera brands. In certain preferred alternate embodiments, the camera images and associated recorded identification ("ID") ID numbers can be stored directly on a standard digital camera memory chip. The recorded images with associated ID numbers can then be downloaded manually onto a computational system, such as a personal digital assistant, a personal computer or a laptop computer. These images can then be retrieved directly from the computer, such as by the photographer, and sorted by ID number, to be given or sold to the person who was photographed or other third party requestor or customer. Alternatively, in still certain other preferred embodiments, the recorded images with associated ID numbers can be uploaded from storage on a computational system to a web-linked database, such as via phone lines or DSL, or cable or other such link. In certain additional preferred embodiments, digital photo images with associated ID numbers can be uploaded via wireless link, directly from the camera based site, to an Internet linked database.

In some embodiments a digital data memory storage system and method may comprise a web site accessible database housed on a web server system with internet access as the central hub of such a product for customer access to recorded photos and/or video. Such a system not only provides a user-friendly customer interface, but also can help automate a photographer's camera upload process. The website, and associated programming behind it, can facilitate data distribution processes including uploading pictures from a photographer's camera, customer search and sort capability, and customer downloads and purchase. The Internet accessible database method can give a customer the capability to have instant on-line access to his or her pictures/video. Certain still alternate preferred embodiments of the method of the present invention comprise a user friendly customer interface where the customer can just login and type in his/her ID code for instant access to his/her pictures or video. The customer will have the ability to perform targeted searches on a picture database and purchase only the images of interest and after partial or complete observation on a video screen receiving photographic records from the web site.

Furthermore an example a web accessibility technique comprised within yet other alternate preferred embodiments of the present invention is provided: One or more cameras will each have a wireless receiver hardware module and antenna attached. For manual camera applications, the present invention may be configured to attach to hot shoe coupled with the manual camera. For automated cameras, the hot shoe can be used to mount hardware, or the hardware can be placed away from the camera in a fixed location. In one such embodiment, surfers can be given a waterproof transmitter to be attached to clothes or body of the surfer, or a surfboard. Alternatively, a keychain with a transmitter can attach to clothes, or a nose guard with a transmitter can be attached to a surfboard. The transmitters can be made available at no charge, or rented and/or a monetary deposit in conformance with the instant business model. The transmitter device may have the associated web address for database access printed on it, along with the surfer's unique ID number which the transmitter is programmed to transmit.

In such an embodiment, automated cameras are aimed at main surf zones or any high volume surf location, and are zoomed in and adjusted accordingly. When a surfer passes through the camera's field of view, with his transmitter turned on, his unique ID number gets broadcast to and received by the camera-based receiver, and logged into memory with associated photos or video. The memory with photos and ID numbers are uploaded to the website accessible database. After surfing, the surfer can go home and log in to the associated web page for instant access to his/her pictures or video.

Where automated equipment cannot be or is not configured at a particular implementation or location, e.g., a beachfront, then paid photographers can attach the Camera Side Module hardware to their cameras. Similar to the automated cameras, the manual camera's pictures will have the surfer's unique ID numbers logged to memory along with their pictures.

Similarly, certain other additional alternate preferred embodiments of the method of the present invention provide a system useful for winter sports photography. For example, skiers and snowboarders at a resort can be given a weather resistant transmitter to be attached to or coupled with their body, clothes or equipment. A keychain can attach to clothes, or it can be attached to snow equipment. Similar to the surf example, the transmitters can be rented, pre-sold, made available at no charge and/or a monetary deposit can be required depending on the relevant and applied business model. Each transmitter device may optionally have the web address for retrieval and the assigned ID number printed on or visually presented on the outside of the transmitter device. The transmitter device is programmed to transmit a unique ID number. Automated cameras may be aimed at selected locations, e.g., ski zones, terrain parks, or any high volume activity area. The camera may be adjusted in relation to the environment of the camera's location to enable the camera to more typically generate better photographic images. When a skier passes through the camera's field of view, his unique ID number is logged to the current video segment or picture most recently generated by the camera. After a long day, the skier can go home and log in to an associated web page for instant access to his/her pictures or video.

In still other additional preferred embodiments of the method of the present invention, a Theme Park example is provided with still and/or video camera equipment, and alternately or additionally for a manual equipment photographer. Customers will be given a transmitter device to carry around the park. This can be attached to clothes. Cameras are aimed at selected location, high volume activity locations, park rides entrances or segments, etc., and are zoomed in and optically adjusted to better generate marketable photographic images. When a customer passes through the camera's field of view, his unique ID number is transmitted by the transmitter device and received by the receiver of the camera. The ID number is then stored in a record of the digital device module and is associated with to the most recently generated, or a closely temporally associated, video segment or picture. After a long day, the customer can go home and log in to the associated web page for instant access to his/her pictures or video. Other versions of embodiments can be envisioned by and made obvious to one of skill in art in light of this disclosure. For example, in addition to the automated cameras, paid photographers can walk around the park taking pictures. Similar to the automated cameras, the manual camera's pictures will have customer ID numbers stored as records and associated with appropriate photographic image records of a digital memory device module.

One particular advantage of certain yet other additional preferred embodiments of the method of the present invention is that ID code numbers can be transmitted to camera side devices at considerable distances, and in particular can be configured to transmit the ID numbers in ranges significantly more than a 20 feet distance between transmitter and receiver, and optionally more than 1,000 feet in certain other preferred embodiments of the method of the present invention.

It is understood that in certain alternative preferred embodiments of the Method of the Present Invention access to and/or availability of the records or documents may be limited to specified individuals, permitted upon payment or promise of payment, a showing of permission, or after a time delay. The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which:

FIG. 5 is a syntax diagram of an image message generated by the camera side device of FIGS. 1 and 3;

FIG. 14A is a schematic of the process flow of FIG. 13A; and

FIG. 14B is a schematic of the process flow of FIG. 13B

DETAILED DESCRIPTION OF PREFERRED EMBODIMENTS

The following description is provided to enable any person skilled in the art to make and use the invention and sets forth the best modes contemplated by the inventor of carrying out his or her invention. Various modifications, however, will remain readily apparent to those skilled in the art, since the generic principles of the Present Invention have been defined herein.

Figure 1:
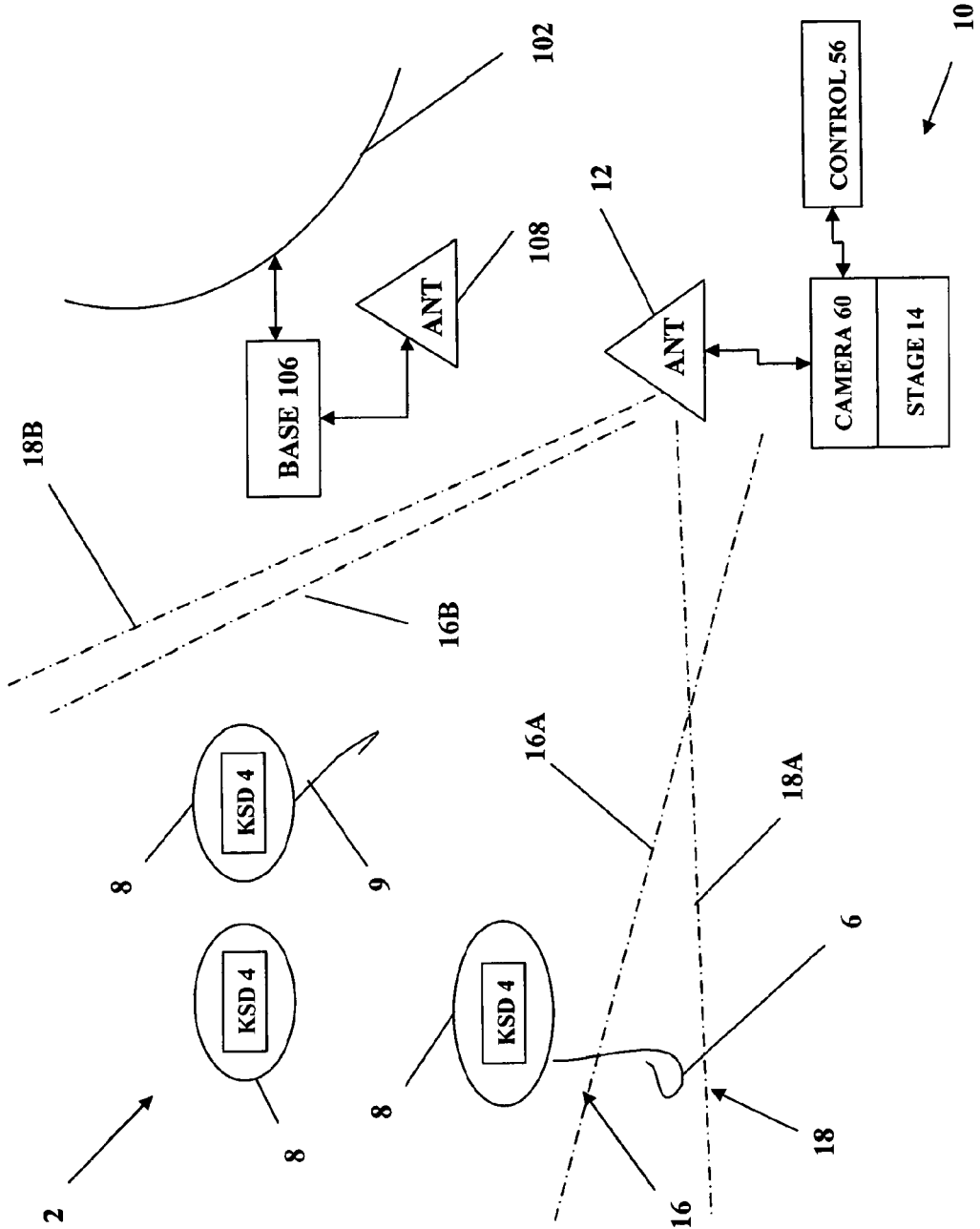
FIG. 1 is an illustration of a first preferred embodiment of the present invention, or first system.

Referring now generally to the Figures and particularly to FIG. 1, FIG. 1 is an illustration of a first preferred embodiment of the present invention, or first system 2. A plurality of Keychain Side Devices 4 ("KSD 4") is each coupled with a specific subject, such as a user, animal, object or location. It is understood that the term subject is defined to include herein a person, a living being, a geographic fixture, a vehicle, a real property, a location, a building, an equipment, and an object. The coupling of the KSD 4 with a person may be accomplished by a strap 6 of a KSD 4 that physically attaches a transmission module 8 to a person. The coupling of the KSD 4 with an object or a location may be accomplished by a hook 9 of a KSD 4 that physically attaches a transmission module 8 to a user. It is understood that the terms "coupled" and "coupling" are defined herein to include direct or indirect mechanical or physical attaching and attachment. It is further understood that the term "communicatively coupled" and "communicatively coupling" are defined herein to include the enablement of and/or capability to transmit and receive messages via wireless transmission means and techniques, and not requiring a direct or indirect physical or mechanical attachment or coupling. The transmitter modules 8, as described below in reference to FIG. 2 and elsewhere within this disclosure, transmits messages to a Camera Side Device 10 ("CSD 10") via an antenna 12 of the CSD 10. It is understood that the CSD antenna 12 may be a directional antenna. In certain alternate preferred embodiments of the present invention he KSD 4 may be configured to transmit information, and the CSD 10 may be configured to receive the information transmitted by the KSD 4, over a distance greater than a 20 feet, and optionally more than 1,000 feet.

The CSD 10 may optionally be mounted on a rotating stage 14, wherein the visual range of the CSD 10 may be increased by rotating and/or translating the CSD 10 (optionally within up to six degrees of freedom) to capture wider areas of a transmission operating region 16 (defined within the lines 16A and 16B) within a photographic field of view 18 (defined within the lines 18A and 18B) of the CSD 10.

Figure 2:
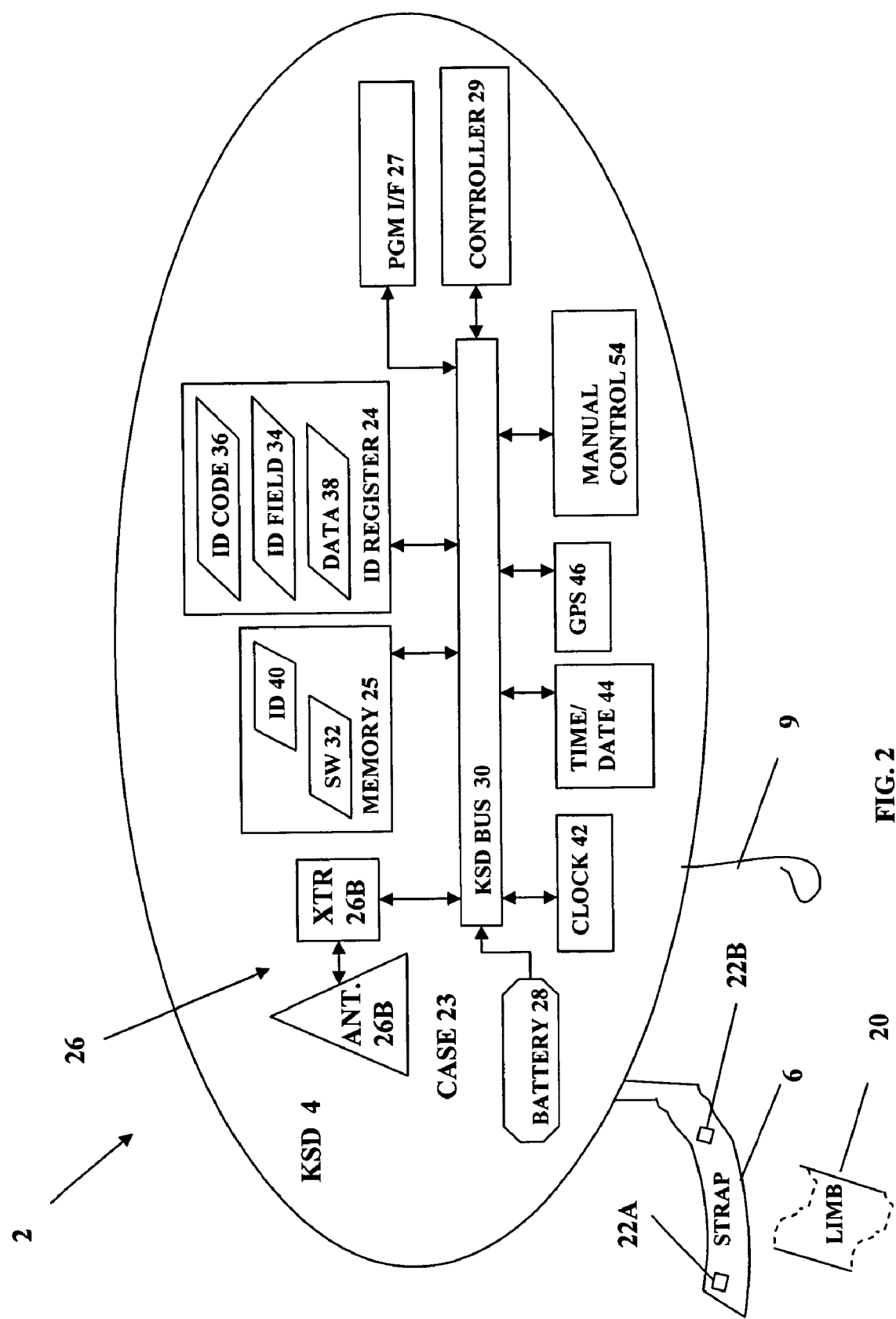
FIG. 2 is a schematic of a wireless transmission device, or keychain side device, of the first system of FIG. 1.

Referring now generally to the Figures and particularly to FIG. 2, FIG. 2 is a schematic of the KSD 4 of the first system 2 of FIG. 1. The KSD 4 includes the (a.) transmission module 8 and (b.) the strap 6 and/or the attachment hook 9. The strap 6 wraps fully around a limb 20 of the user, such as an ankle or wrist, and is detachably secured to the user's limb 20 by means of a hook and fastener assembly 22A & 22B of the strap 6. It is understood that in certain alternate preferred embodiments of the method of the present invention the transmission module 8 may be removably attached to an article of clothing by means of an attachment means known in the art, to include buckles, safety pins and pressure clips. The transmission module 8 includes a case 23, an identification register 24, a digital memory device 25, a transmitter 26 comprising a transmission interface 26A and an antenna 26B, an optional programming interface 27, a battery 28 and a controller 29. The identification register 24, digital memory device 25, transmitter 26, optional programming interface 27 and controller 29 are communicatively coupled via a KSD communications and power bus 30 ("KSD bus 30"). The battery 28 provides electrical power to the identification register 24, optional digital memory device 25, transmitter 26, programming interface 27, and the controller 29 via the KSD bus 30. The case 23 houses, protects and is coupled with the identification register 24, the optional digital memory device 25, the transmitter 26, the optional programming interface 27, the battery 28, the controller 29 and the KSD bus 30. It is understood that in certain alternate preferred embodiments of the method of the present invention the battery 28 may be a energy receptor and storage device that harvests and stores energy stored via radio wave transmission and then provides the harvested and stored data to power the KSD 4. The controller 29 is a logical device that controls the operations of the KSD 4 via the KSD bus 30 and in accordance with a KSD system software 32. The KSD system software 32 is partly or wholly stored within the digital memory device 25 and/or the KSD controller 29. The identification register 24 ("ID register 24") is a memory device than may be read only memory, random access memory, programmable memory, and/or other suitable electronic memory device in the art. An ID field 34 of the ID register 24 stores an identification code 36 ("ID code 36"), the ID code 36 uniquely distinguishing each KSD 4 from the plurality of KSD's 4. An optional data field 38 of the ID register 24 may be used to store additional information, such as indicia of ownership or source of the ID register 24. A user personality identifier 40 may be stored in the digital memory device 25, wherein the user personality identifier 40 associates a specified person, location or object temporarily or permanently associated with the KSD 4. The optional programming interface 27 may be used to enter the ID code 36 and/or the personality identifier 40 into the ID register 24 and/or the optional digital memory device 25. The optional programming interface may comprise a keyboard or other suitable data interface device known in the art. The optional programming interface 27 may also be used by a user to direct the controller to format, issue and transmit a request to the CSD 10 to take a photograph.

The KSD 4 may optionally include one or more additional modules, to include a clock 42, a time date stamp circuit 44, a GPS locator module 46 and/or a manual control 48, each of which are communicatively coupled with the KSD bus 30 and are powered by the battery 28. The clock 42 may inform the controller 29 when to periodically read data from ID register 24 and when to format and transmit an ID message 50 via the KSD transmitter, as per FIG. 5. The time date stamp circuit 44 may provide the KSD controller 29 with time and date information 52 to include in the ID message 50. The GPS locator module 46 may receive or generate geographical positioning information 54 on the basis of signals received form the Earth orbiting satellite transmissions by means of the KSD transmitter 26. The GPS locator module 46 processes the satellite transmissions received via the KSD transmitter 26 and transmits geographical positioning information 54 derived from the satellite transmissions to the controller 29 for inclusion in the ID message 50.

The manual control 54 may be enable a user to direct the KSD controller 29 to prepare and transmit an ID message 50 via the antenna 46 to the CSD 10 and/or request the CSD 10 to capture an image by taking a photograph.

Figure 3:
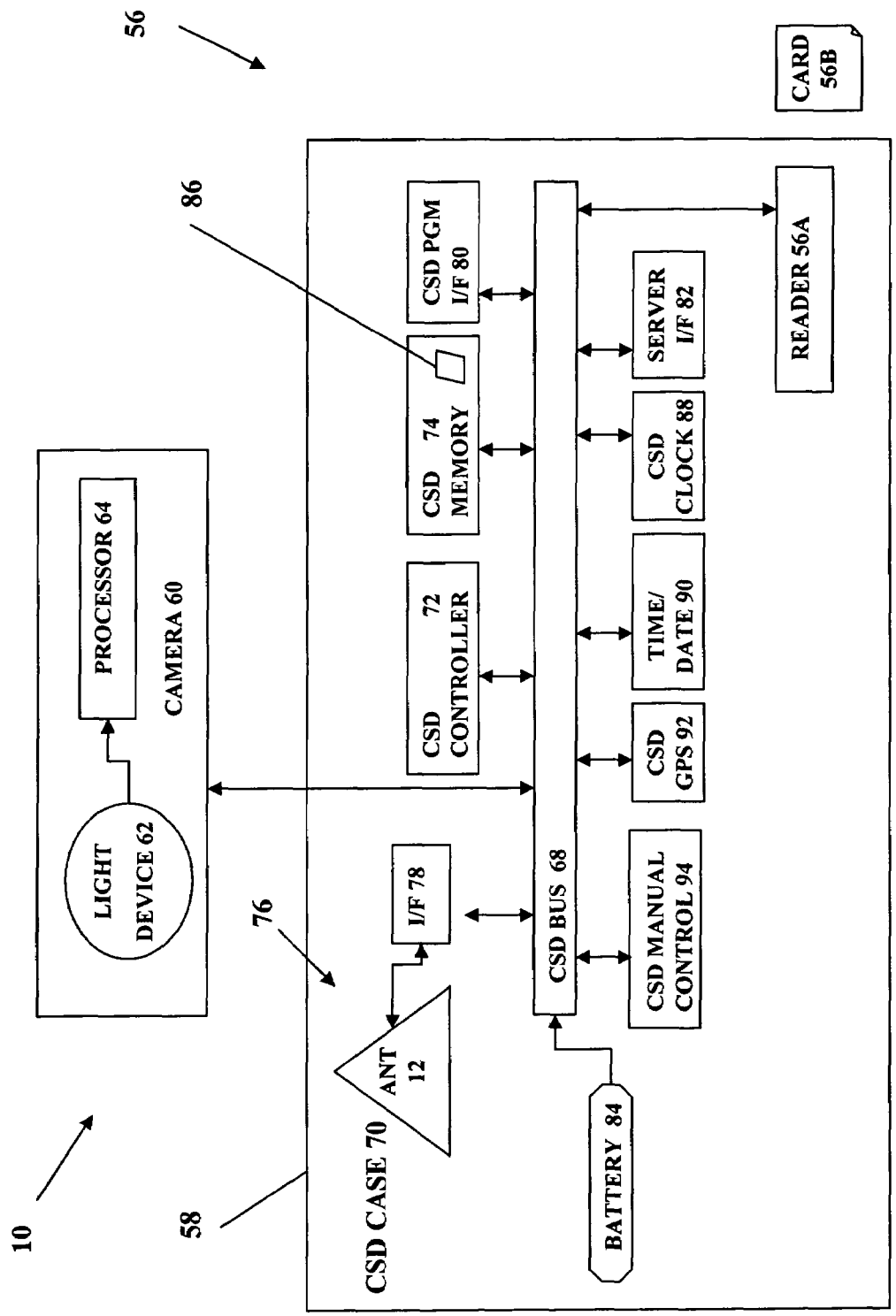
FIG. 3 is a schematic of a camera side device of the first system of FIG. 1 and having a wireless receiver, a digital storage module and a camera.

Referring now generally to the Figures and particularly to FIG. 3, FIG. 3 is a schematic of the CSD 10 of FIG. 1 comprising the CSD antenna 12, a CSD control module 56 comprising a CSD digital data storage module 58, and a camera 60. The camera 60 is a digital camera having a light-sensitive pickup electronic device 62 coupled with a digital image processor 64. The light-sensitive pickup electronic device 62 converts received visual signals of light energy into electrical impulses and translates the electrical impulses to the digital image processor 64. The digital image processor 64 converts the electrical impulses generated by and received from the light-sensitive pick-up device 62 into a digital image document 66. The digital image processor 64 is communicatively coupled with a CSD communications and power bus 68 ("CSD bus 68") of the control module 56, and transmits the digital image document 66 to the control module 56 via the CSD bus 68.

The CSD control module 56 includes a CSD case 70, the CSD digital memory storage device 56, a CSD controller 72, a CSD digital memory device 74, a transmitter 76 comprising a transmission interface 78 and the antenna 12, an optional CSD programming interface 80, a server interface 82, and a CSD battery 84. The CSD controller 72, CSD digital memory device 74, transmitter 76, CSD programming interface 80 and a server interface 82 are communicatively coupled via the CSD bus 68. The battery 84 provides electrical power to the CSD digital memory storage device 56, the CSD controller 72, the CSD digital memory device 74, transmitter, the CSD programming interface 80, and server interface 82 via the CSD bus 68. The CSD case houses, protects and is coupled with the CSD digital memory storage device 56, the battery 84, the CSD controller 72, CSD digital memory device 74, transmitter, CSD programming interface 80, and server interface 82 and the CSD bus 68.

The CSD controller 72 directs the operations of the control module 56 in conformance with a CSD system software 86. The CSD system software 86 may be stored within or distributed among the CSD controller 72, the CSD memory device 74, and/or the CSD digital memory storage device 56.

The CSD 10 may optionally include one or more additional modules, to include a CSD clock 88, a CSD time date stamp circuit 90, a CSD GPS locator module 92 and/or a CSD manual control 94, each of which are communicatively coupled with the CSD bus 68 and are powered by the CSD battery 84. The CSD clock 88 may inform the CSD controller 72 when to periodically read data from the CSD digital memory storage device 56 and when to format and transmit an image message 96 via the CSD transmitter 76, as per FIG. 6. The CSD time date stamp circuit 90 may provide the CSD controller 72 with a time and date information 98 to include in the image message 96. The CSD GPS locator module 92 may receive or generate geographical positioning information 54 on the basis of signals received form the Earth orbiting satellite transmissions by means of the CSD transmitter 76. The CSD GPS locator module 92 processes the geographical information received from the CSD transmitter 76 and transmits geographical positioning data to the CSD controller 72 for inclusion in the image message 96.

The CSD manual control 94 may be enable an operator to direct the CSD controller 72 to prepare and transmit the image message 96 via the CSD transmitter 76 and/or request the server interface 82.

The CSD memory storage device 56 comprises a memory card interface 56A, or digital media reader 56A, and a removable memory card 56B, where the memory card interface 56A is configured to write image messages 96 into a memory of the memory card 56B. The removable memory card 56B may be or comprise a CD ROM, a DVD, a PCMCIA memory card or other suitable memory media known in the art.

Figure 4:
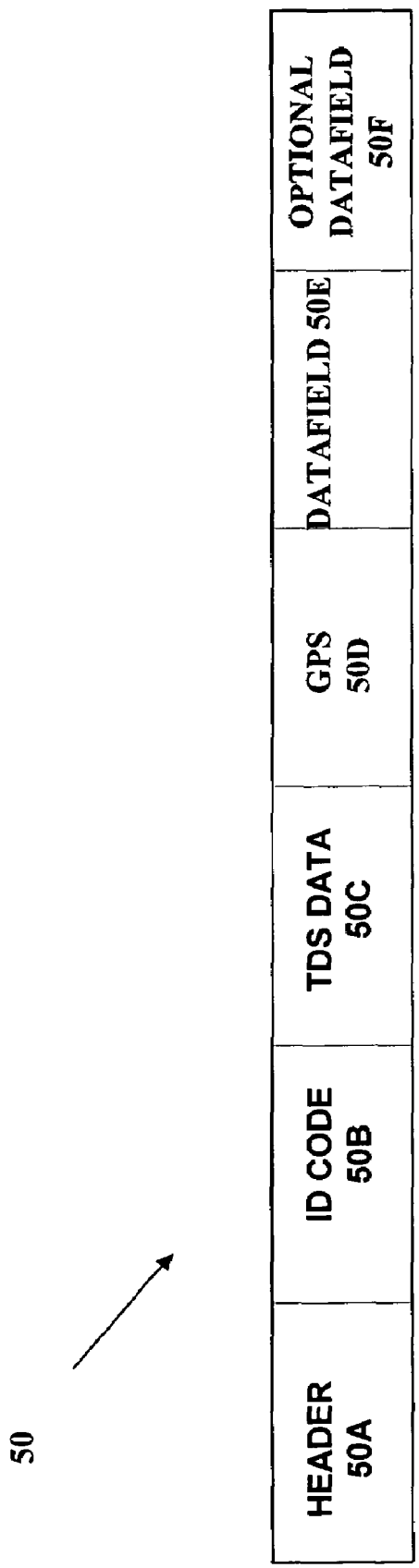
FIG. 4 is a syntax diagram of an identification message generated by the keychain side device of FIGS. 1 and 2.

FIG. 4 is a syntax diagram of an ID message 50 generated by the keychain side device 4 of FIGS. 1 and 2. A header data field 50A contains information that initiates and identifies the ID message 50. The ID code 36 is stored in an ID code data field 50B. Time date information 52 is stored in a TDS data field 50C. Geographic position data 54 is stored in a GPS data field 50D. The optional user personality identifier 40 is stored in the data field 50E. An optional open data field 50F permits the inclusion of other information. A tail data field 50G contains information that identifies and concludes the ID message 50.

FIG. 5 is a syntax diagram of an image message 96 generated by the camera side device of FIGS. 1 and 3. A header data field 96A contains information that initiates and identifies the image message 96. The ID code 36 is stored in an IM ID code data field 96B. Time date information 98 is stored in an IM TDS data field 96C. Geographic position data 54 is stored in an IM GPS data field 96D. The digital image document 66 is stored in a data field 96E. Where the format of the digital image document 66 includes attributes, e.g., in accordance with a JPEG format, the ID code 36 may be included as attribute to the digital image document 66 and stored in the data field 96E.

It is further that the digital image document 66 may be single frame data or video data. It is further understood that the image message 96 may include a plurality of data fields 96B wherein information received in a plurality of ID messages 44 generated by more than one KSD 4 is associated with the digital image document. An optional service provider data field 96F may include information related to the person, corporation, or entity providing the first system 2. An optional camera data field 96G may include information related to the camera 60. An optional location data field 96H may include information related to the location of the camera 60 and/or the first system 2. A tail data field 96I contains information that identifies and concludes the image message 96.

Figure 6:
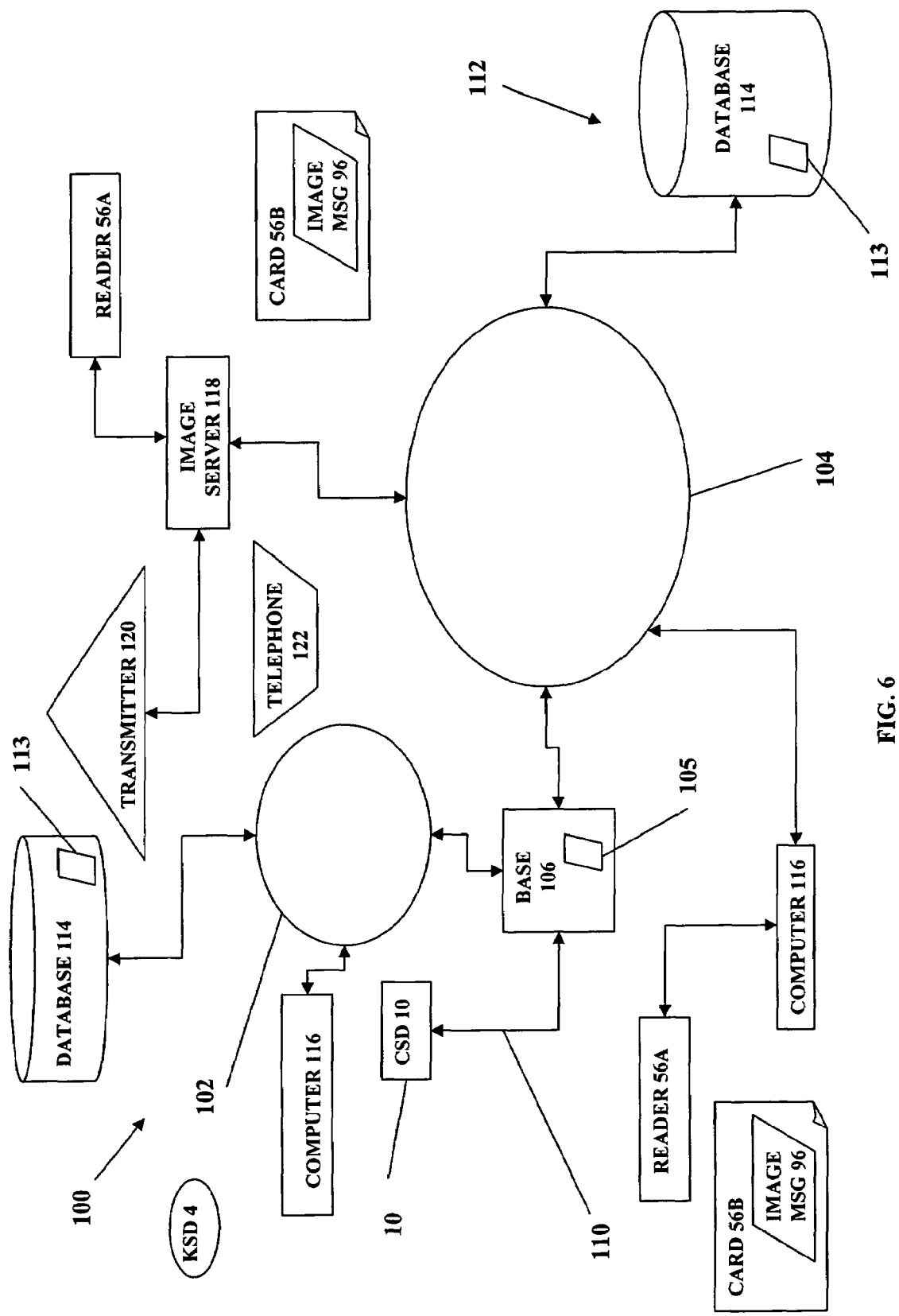
FIG. 6 is a second preferred embodiment of the method of the present invention, or second system.

Referring now generally to the Figures and particularly to FIG. 6, FIG. 6 is a second preferred embodiment of the method of the present invention 100, or second system 100, comprising the first system 2 of FIG. 1, a communications network 102 and optionally the Internet 104. The communications network 102 may be or comprise a telephony system, a wireless telephony system, and/or a computer communications network. The CSD 10 is communicatively coupled via a server base station 106 with the communications network 102, and optionally to the Internet 104. In accordance with a network system software 105, a server base station 106 communicates with the CSD 10 via a server transceiver 108, as shown in FIG. 1. Alternatively or additionally, the server base transceiver 108 may be communicatively coupled via the server interface 82 to the CSD data bus 68 by a hard wire connection 110. The hard wire connection 110 may be or comprise wire, cabling, optical fibers, or other suitable signal transmission media known in the art. Image messages 96 may be transmitted to the server base station 106 and therefrom made accessible to the communications network 102 and/or the Internet 104.

Image messages 96 may be transmitted via the communications network 102 to a data library system 112. The data library system 112 comprises a data base 113 maintained by an image memory data base module 114. The image messages 96 are made accessible while stored in one or more image data base 113 maintained by the image memory data base module 114. A data library system 115 comprises a data base 113 maintained by the image memory data base module 114. The image data base 113 may be accessed by a network computer 116, whereby a user may search for image messages 96 associated with a time and date, a location, an ID code 36, a GPS information 54, a personality identifier 40, or other information stored in an image message 96.

Alternatively or additionally, Image messages 96 may be transmitted via the Internet 104 to one or more image memory data base modules 114. The image messages 96 are stored in an image data base 113 maintained by the image memory data base module 114. The image data base 113 may be accessed by a network computer 116 via the Internet 104, whereby a user may search for image messages 96 associated with a time and date, a location, an ID code 36, a GPS information 54, a personality identifier 40, or other information stored in an image message 96.

Image messages 96 may be alternatively delivered to a network computer 116 for access by a user by means of the memory card 54B and a memory card interface 54A. Image messages 96 may be alternatively made accessible by a user by means of an image server 118 via a transmitter 120 and a wireless telephone 122. The wireless telephone 122 may be a portable wireless telephone or a personal digital assistant having a video display configured to visually present still images and or video.

Figure 7:
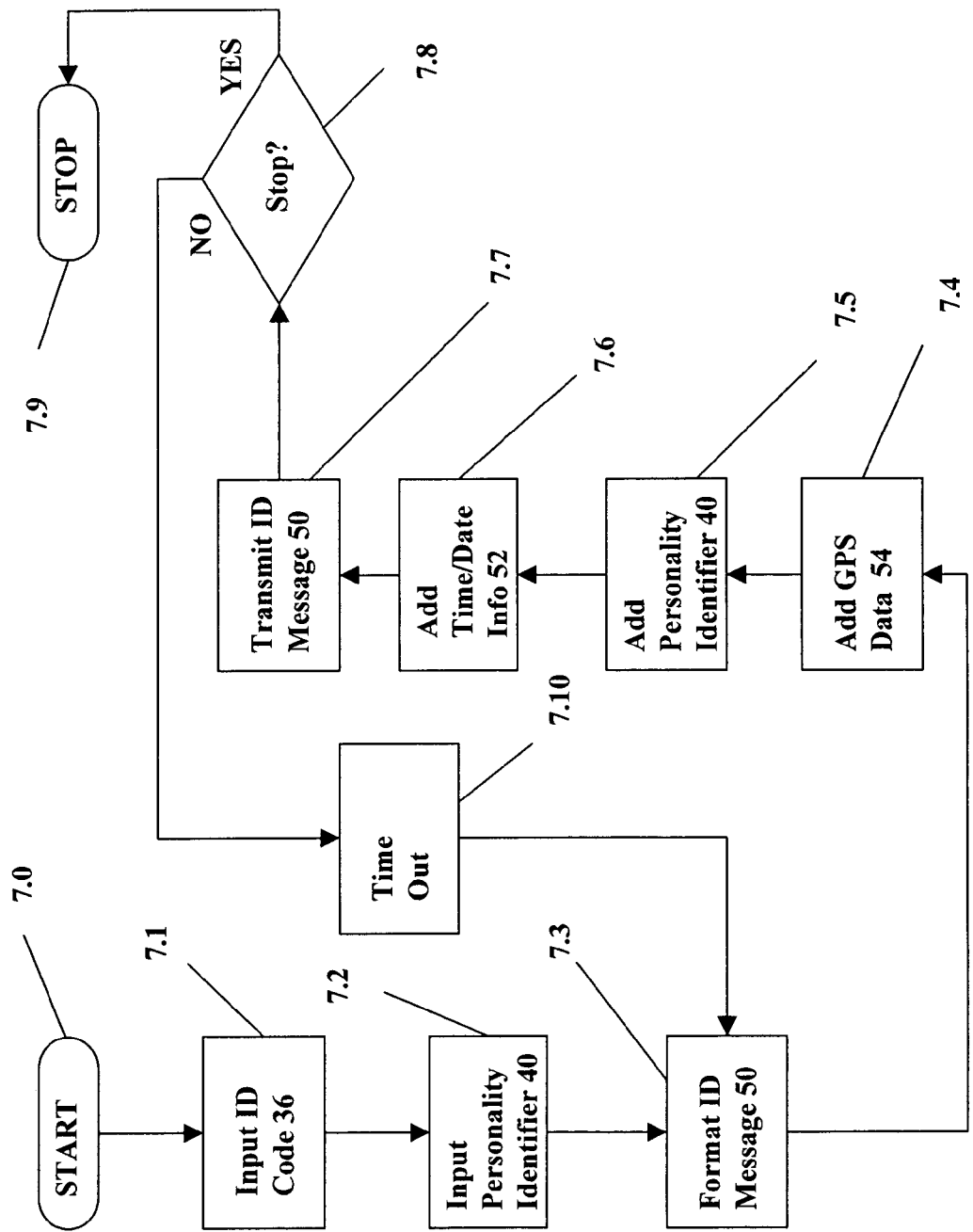
FIG. 7 presents a flow chart of a system software of the keychain side device of FIGS. 1 and 2.

Referring now generally to the Figures and particularly to FIG. 7, FIG. 7 presents a flow chart of the KSD system software 32. In step 7.0 the KSD 4 is powered up and reset. In step 7.1 a KSD ID code 36 is written into the KSD 4 via the programming interface 27. It is understood that in certain alternate preferred embodiments of the KSD 4 the ID code 36 is present in the KSD 4 upon power up and does not have to be written into the KSD 4. In step 7.2 a personality identifier 40 is written into the KSD 4 via the programming interface 27. In step 7.3 the KSD 4 generates and formats an ID message 50. In optional step 7.4 GPS information is entered into the ID message 50. In optional step 7.5 the personality identifier 40 is entered into the ID message 50. In optional step 7.6 time date information 52 is entered into the ID message 50. In step 7.7 the ID message 50 is transmitted via the KSD transmitter 76 to the CSD 10 and/or the server base station 106. In step 7.8 the KSD controller 29 determines whether the KSD shall (a.) power down in step 7.9, or (b.) proceed on to a wait step of 7.10 and from step 7.10 onto step 7.3. It is understood that in certain still alternate preferred embodiments of the KSD 4 a power down may be caused by an interrupt initiated by a user by means of the programming interface 27.

Figure 8:
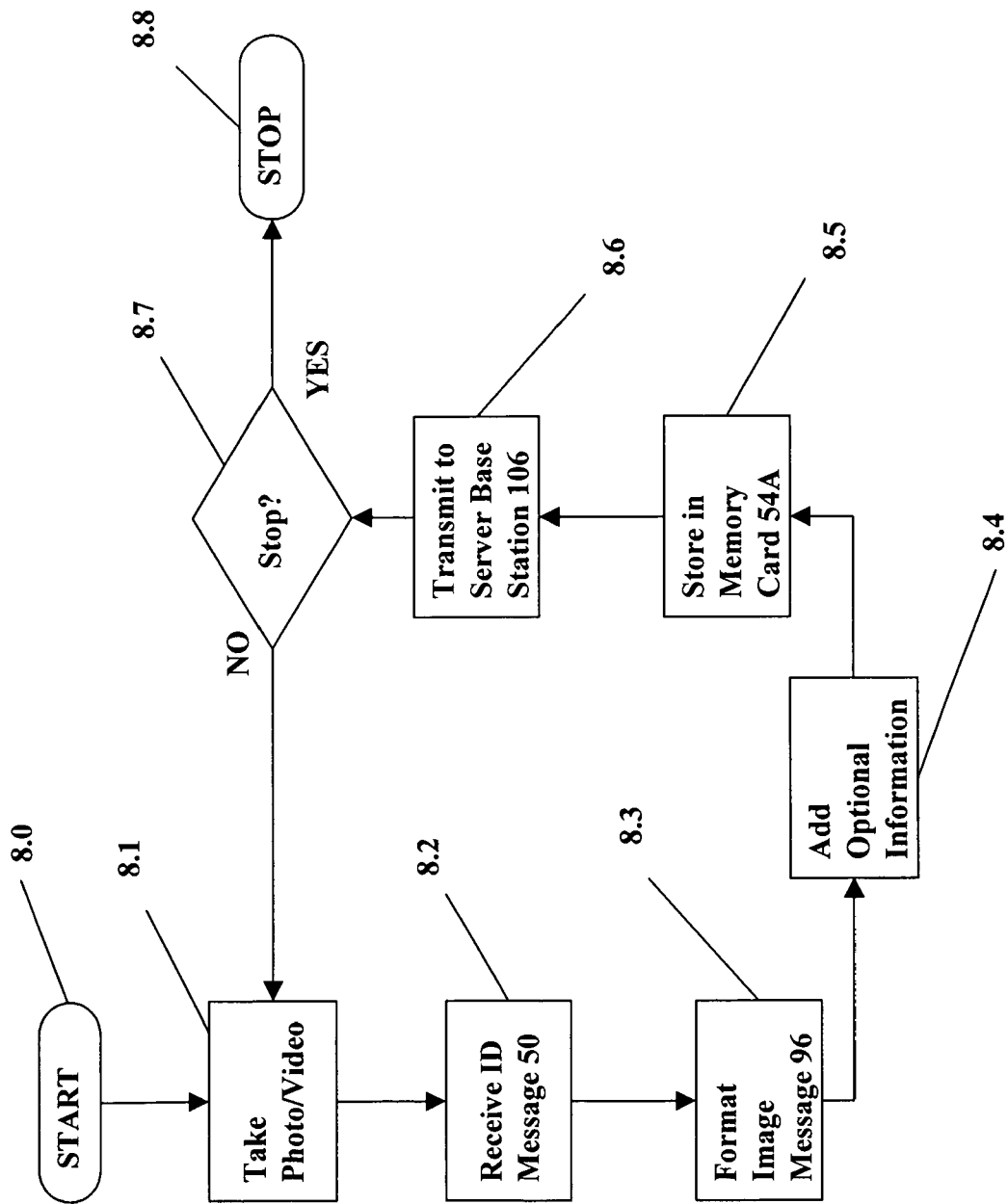
FIG. 8 presents a flow chart of a system software of the camera side device of FIGS. 1 and 3.

2. Referring now generally to the Figures and particularly to FIG. 8, FIG. 8 presents a flow chart of the CSD system software 86. In step 8.0 the CSD 10 is powered up and reset. In step 8.1 the camera 60 takes a photo or records a video file and forms a digital image document 66. In optional step 8.2 the CSD 10 receives an ID message 50 from a KSD 4. It is understood that in certain alternate preferred embodiments of the method of the present invention the ID messages 50 and the image messages 96 are associated by the server base station 82 rather than by the CSD 10. It is further understood that in certain other alternate preferred embodiments of method of the present invention the digital image document 66 associated with the ID code 36 of the ID message 50 is generated within one minute of receipt of the ID code 36 by the CSD 10.

In step 8.3 the CSD 10 generates and formats an image message 96 containing the payload of the digital image document 66 and optionally information harvested from one or more payloads of ID messages 50. Where the format of the digital image document 66 includes attributes, e.g., in accordance with a JPEG format, the ID code 36 may be added as attribute to the digital image document 66 and include in the data field 96E of the image message 96 in step 8.3.

It is understood that more than one User ID code 36 and/or personality identifier 49 may be stored into the image message 96 and associated with the digital image document 66 stored in the same image message 96. In optional step 8.4 GPS information 54, the personality identifier 40, CSD time date information 98 and/or KSD time date information 52 is entered into the image message 96. In optional step 8.5 the image message 96 is written into the removable digital memory card 54A. In step 8.6 the image message 96 is transmitted by the CSD 10 to the server base station 106 by wireless transmission and/or via the hard line 110. In step 8.7 the CSD controller .x determines whether the CSD shall (a.) power down in step 8.8, or (b.) proceed on to step 8.1.

Figure 9:
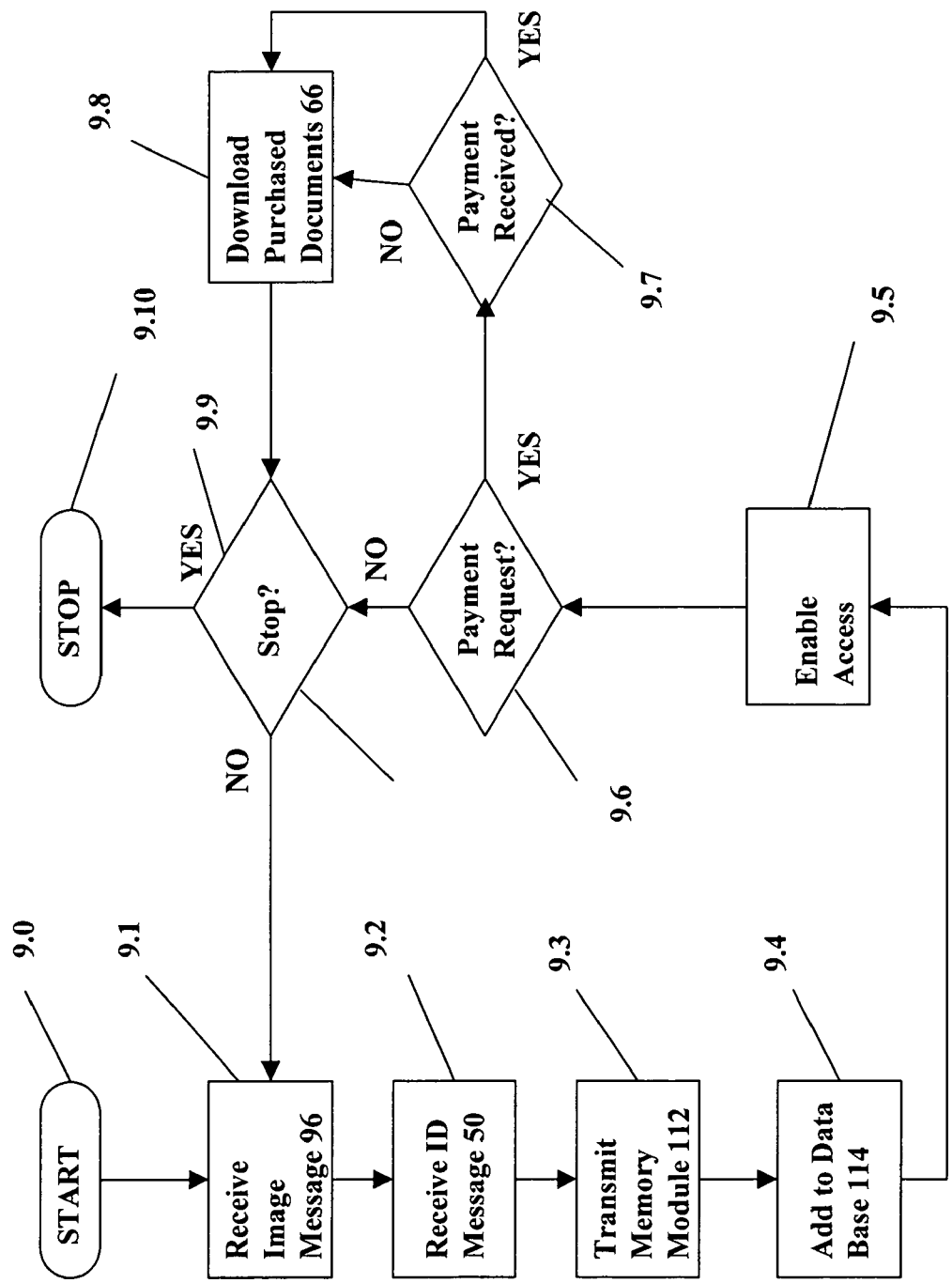
FIG. 9 presents a flow chart of a system software of the second preferred embodiment of the method of the present invention.

Referring now generally to the Figures and particularly to FIG. 9, FIG. 9 presents a flow chart of the network system software 105. It is understood that the network system software 105 may be distributed about the base server system 106, the communications network 102 and/or the Internet 104 is powered up. In step 9.0 the base server system 106 is powered up. In step 9.1 the base server system 106 receives an image message 96 from the CSD 10. In optional step 9.2 an ID message 50 is received from the KSD 4 and integrated into an image message 96. In step 9.3 the image message 96 is transmitted to a memory module 114, or other suitable memory module that is communicatively coupled with the Internet 104 and/or the communications network 102. In step 9.4 the image message is stored into one or more data bases 113 and/or one or more removable data storage cards 54B. In step 9.5 access by the network computer 116 to one or more data bases 113 is enabled. In step 9.6 the network software 105 determines whether a request for a digital image document 66 stored within one or more data bases 114. The request may be issued from a network computer 116 and/or a wireless telephone/PDA 122 and may reference an ID code 36, a personality identifier 40, a time date information 54, or other suitable data stored in a data base 113. When a request is received in step 9.6, and an electronic payment is received in step 9.7, the network system 100 downloads one or more digital image document 66 in step 9.8. In step 9.9 the network system software 105 determines whether the network system 100 shall (a.) cease operations in step 9.10, or (b.) proceed on to step 9.1.

Figure 10:
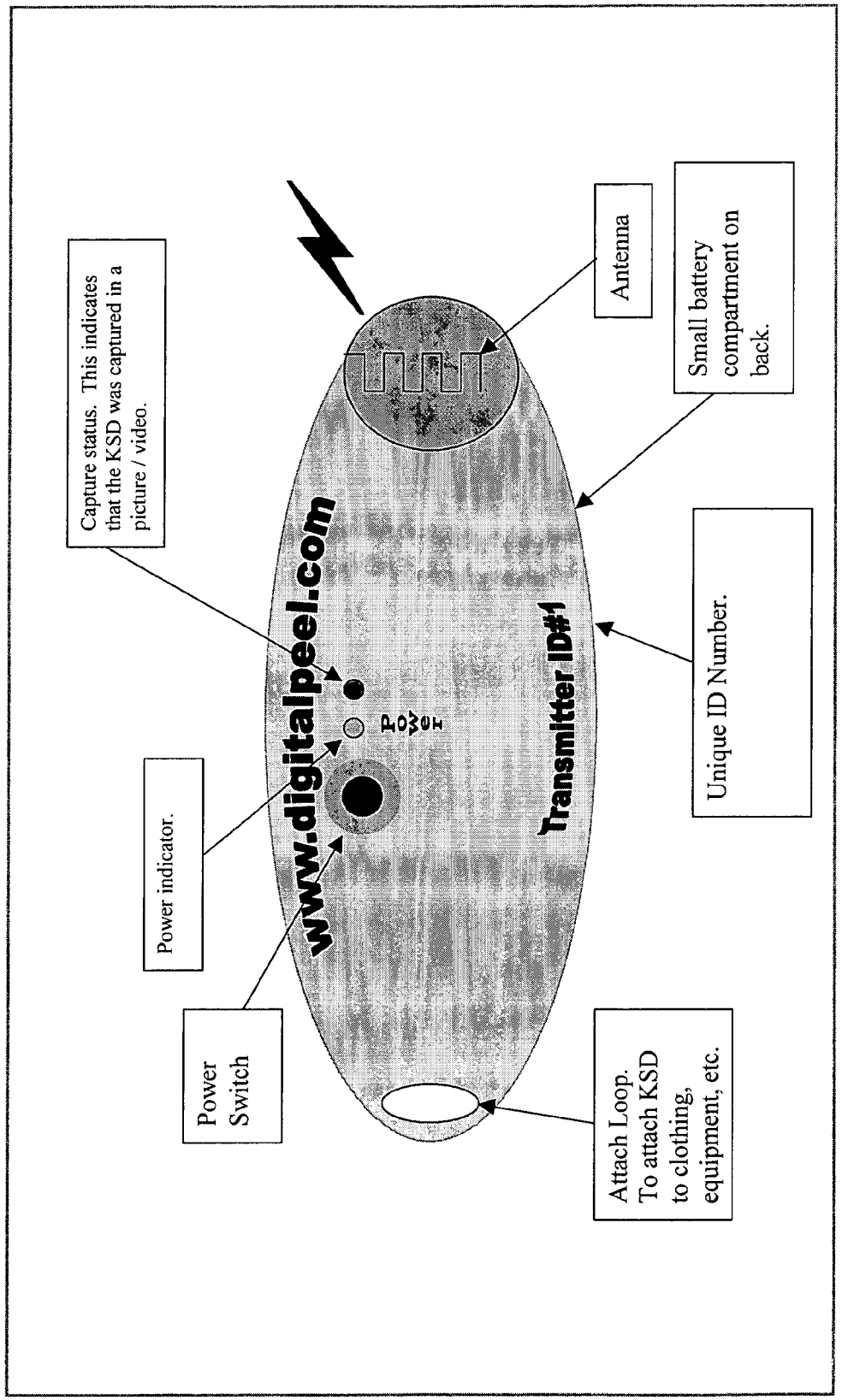
FIG. 10 is a top view of the keychain side device of FIGS. 1 and 2.

Referring now generally to the Figures and particularly to FIG. 10, FIG. 10 is a top view of the KSD 4 of FIGS. 1 and 2.

Figure 11:
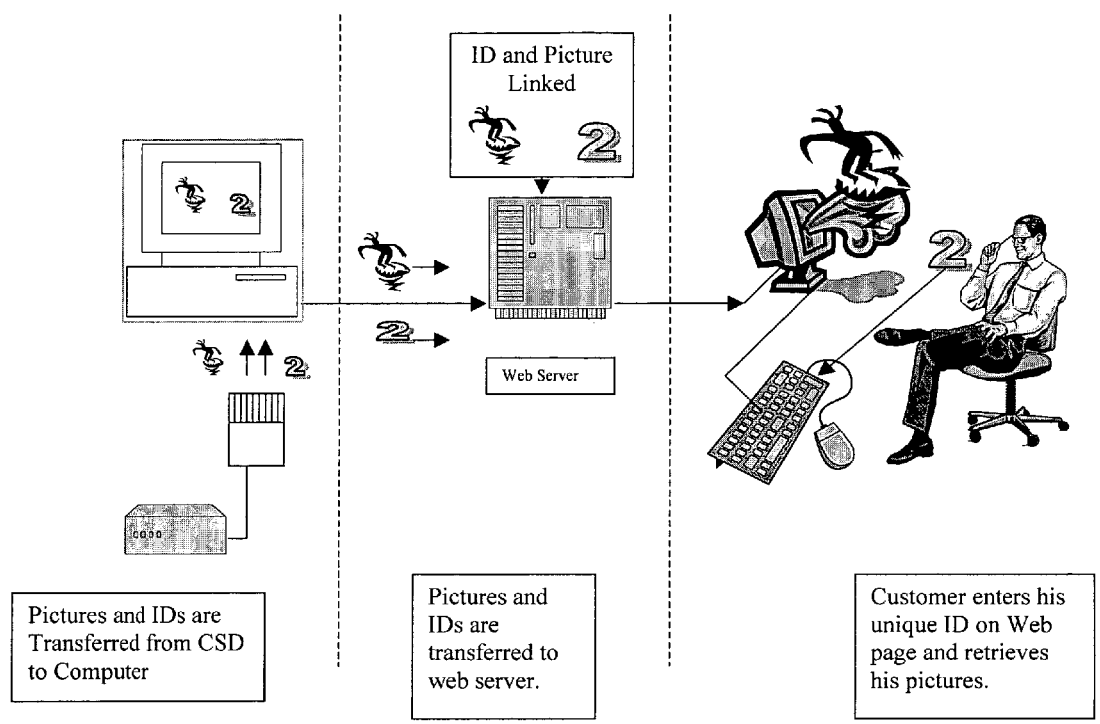
FIG. 11 is an illustration of a first alternate preferred embodiment of the process flow of a second preferred embodiment of the method of the present invention that is enabled by the second system of FIG. 6.

Referring now generally to the Figures and particularly to FIG. 11, FIG. 11 is an illustration of a first alternate preferred embodiment of the process flow of a second preferred embodiment of the method of the present invention that is enabled by the second system 100 of FIG. 6. It is understood that the retrieval of digital image documents 66, i.e. "pictures", may require the customer to submit an electronic payment by means of a purchasing system or method employable via the Internet, or other suitable payment or purchasing system or method known in the art.

Figure 12A:
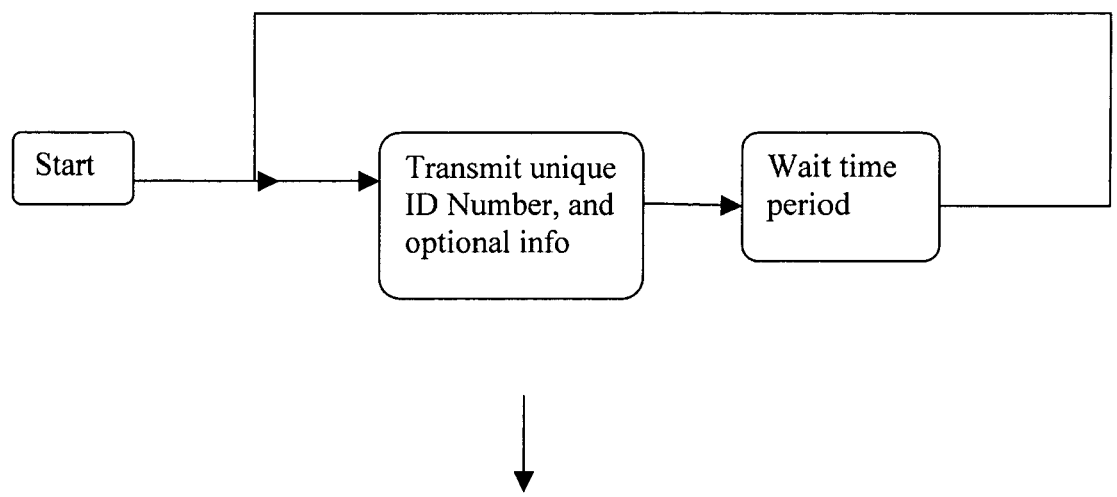
FIGS. 12A, 12B and 12C are schematics of the process flow of FIG. 11.
Figure 12B:
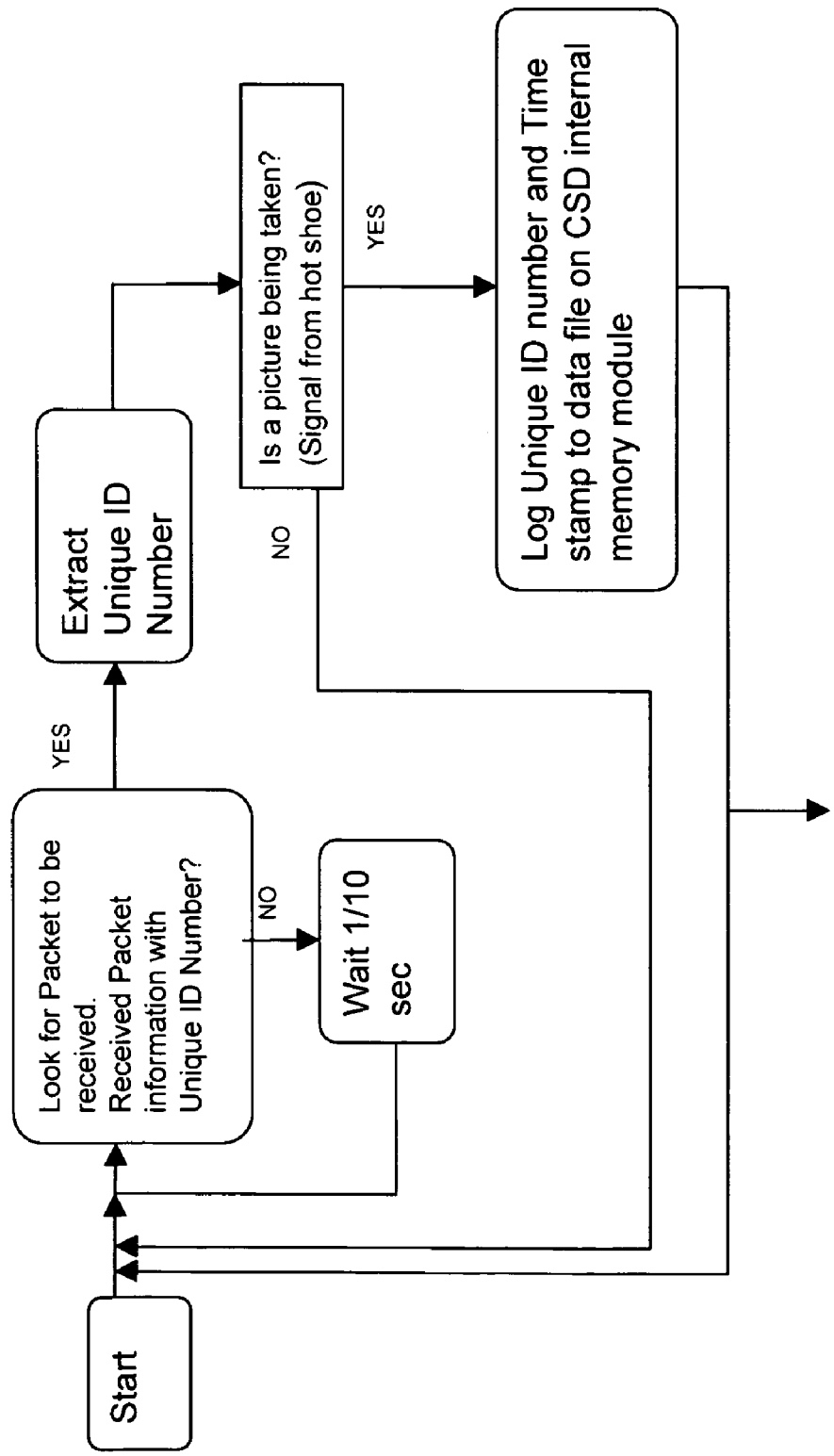
Figure 12C:
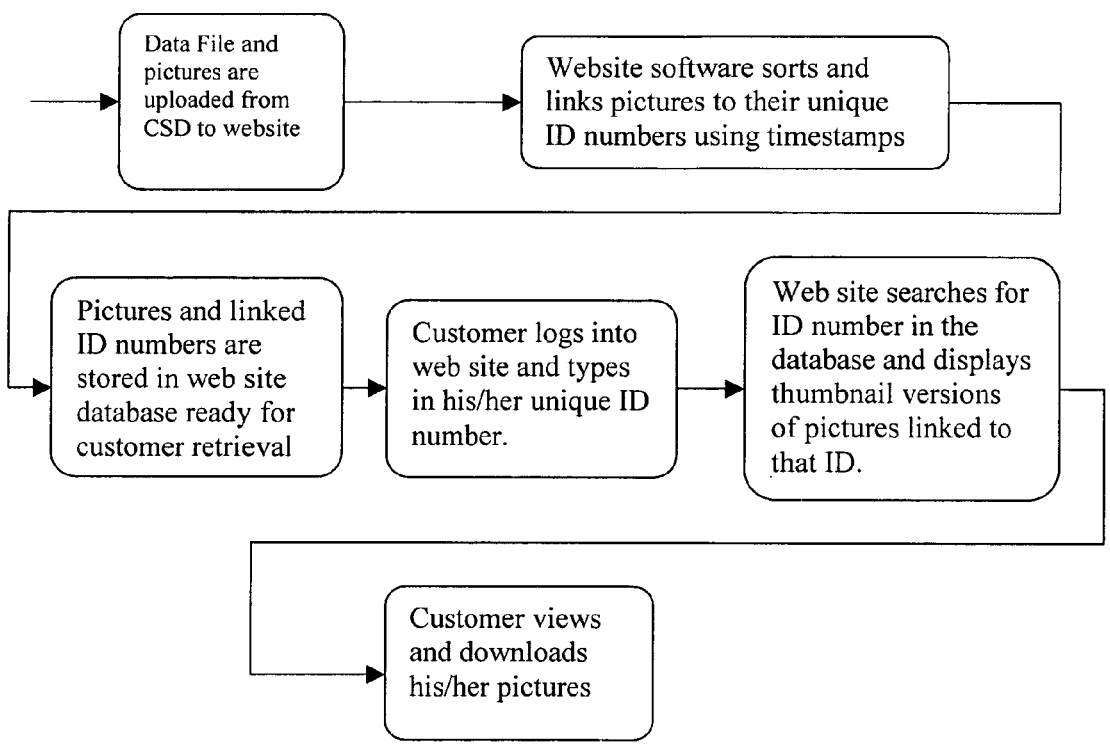

Referring now generally to the Figures and particularly to FIGS. 12A and 12B, FIGS. 12A, 12B and 12C are schematics of the process flow of FIG. 11.

Figure 13A:
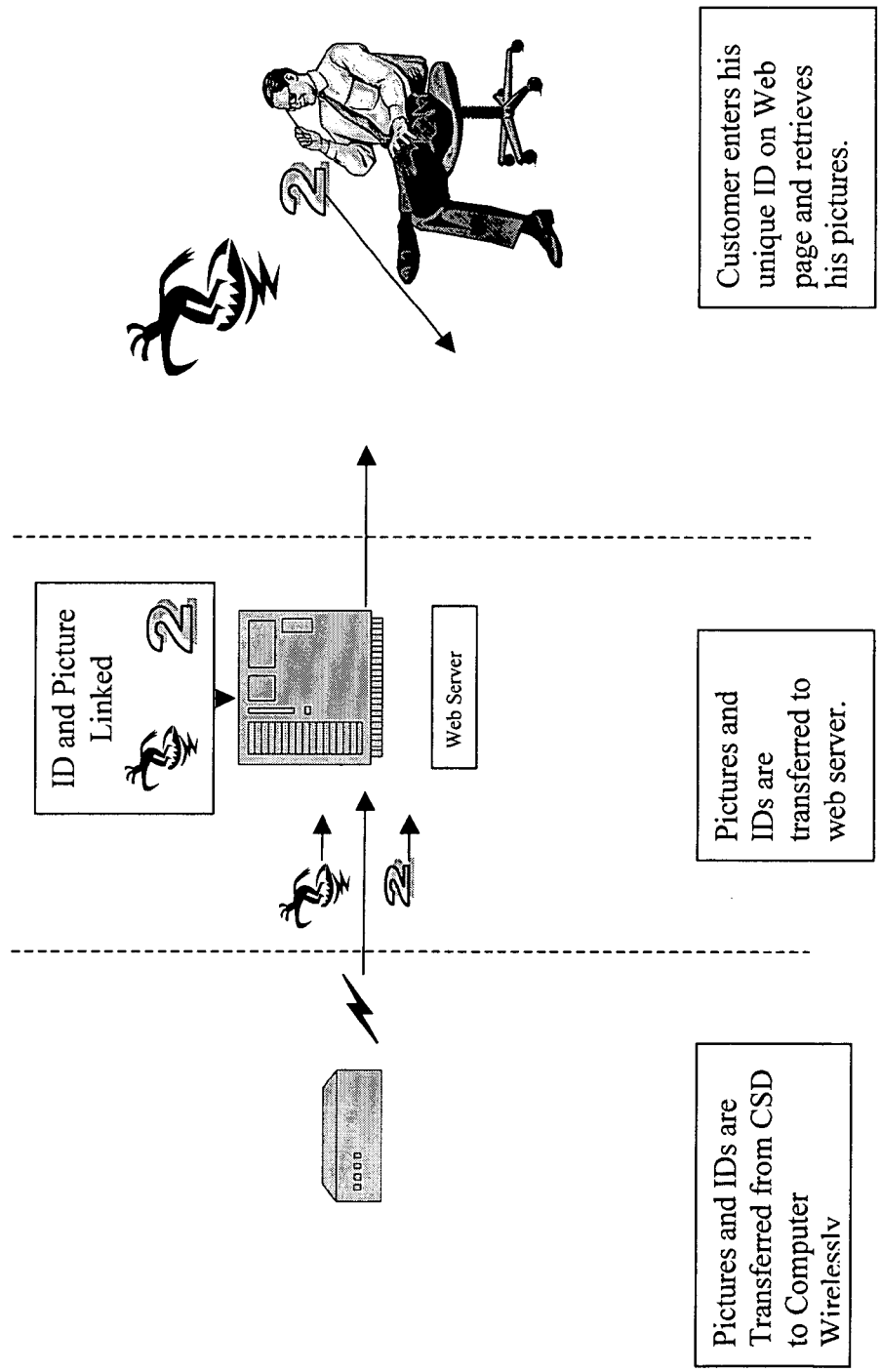
FIGS. 13A and 13B are illustrations of a second and third alternate preferred embodiment of the process flow of a second preferred embodiment of the method of the present invention that is enabled by the second system of FIG. 6.
Figure 13B:
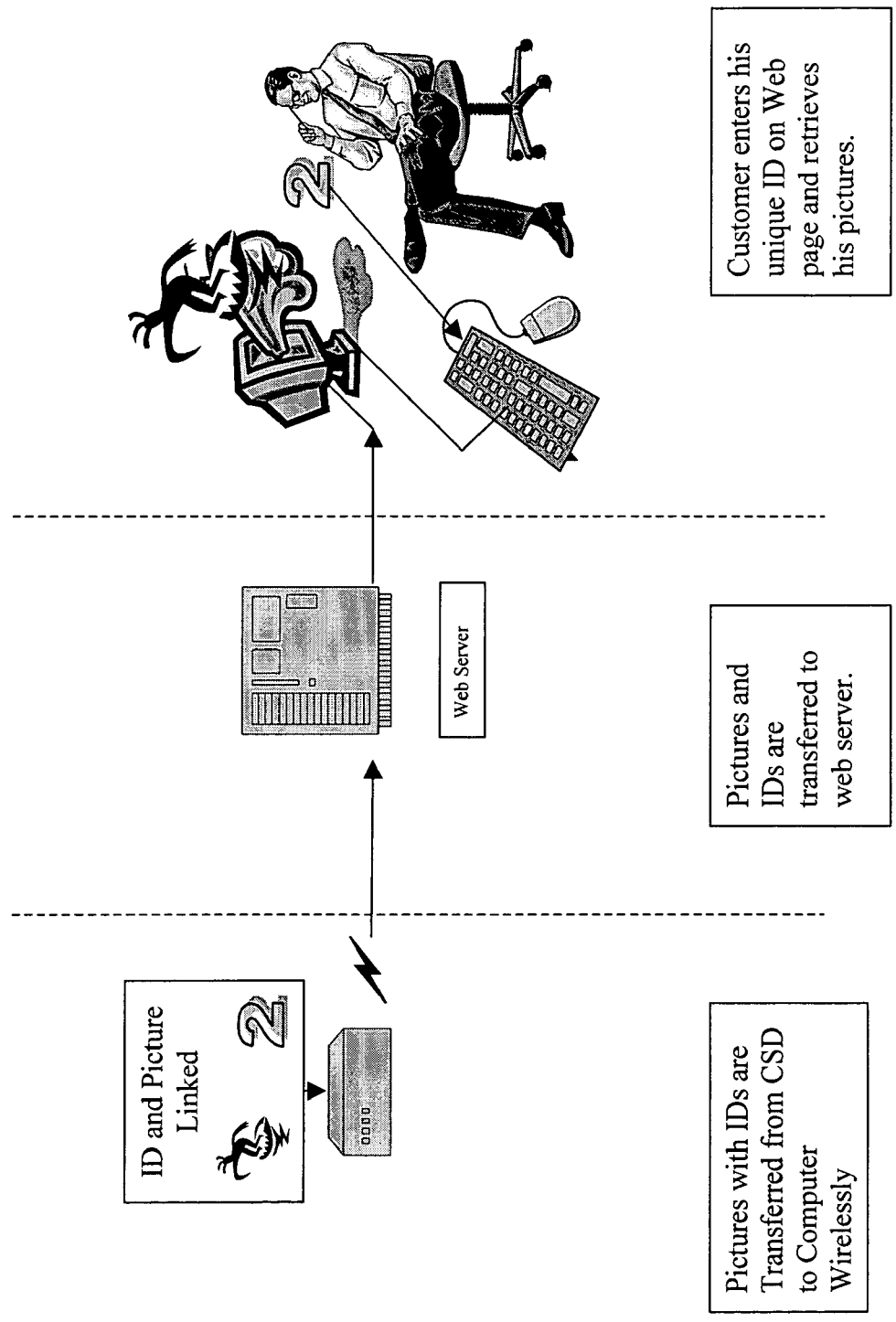

Referring now generally to the Figures and particularly to FIGS. 13A and 13B, FIGS. 13A and 13B are illustrations of a second and third preferred embodiment of the process flow of a second alternate preferred embodiment of the method of the present invention that is enabled by the second system 100 of FIG. 6

Referring now generally to the Figures and particularly to FIG. 14A, FIG. 14A is a schematic of the process flow of FIG. 13A.

Referring now generally to the Figures and particularly to FIG. 14B, FIG. 14B is a schematic of the process flow of FIG. 13B.

Although the examples given include many specificities, they are intended as illustrative of only certain possible embodiments of the invention. Therefore, it is to be understood that the invention may be practiced other than as specifically described herein. Other embodiments and modifications will, no doubt, occur to those skilled in the art. The above description is intended to be illustrative, and not restrictive. Thus, the examples given should only be interpreted as illustrations of some of the preferred embodiments of the invention, and the full scope of the invention should be determined by the appended claims and their legal equivalents. Those skilled in the art will appreciate that various adaptations and modifications of the just-described preferred embodiments can be configured without departing from the scope and spirit of the invention. Other suitable techniques and methods known in the art can be applied in numerous specific modalities by one skilled in the art and in light of the description of the Present Invention described herein. Many other embodiments will be apparent to those of skill in the art upon reviewing the above description. The scope of the invention as disclosed and claimed should, therefore, be determined with reference to the knowledge of one skilled in the art and in light of the disclosures presented above.

I claim:

1. A method of capturing and associating photographic images with a subject, the method comprising:
    coupling a portable radio wave wireless transmitter with the subject, the wireless transmitter for broadcasting an identification code in a wireless transmission;
    providing a wireless receiver, the wireless receiver comprising a directional antenna and configured to receive the identification code broadcast from the wireless transmitter when the wireless transmitter is located within an operating region of the wireless antenna;
    providing a digital storage module, the digital storage module communicatively coupled with the wireless receiver, and the digital storage module for receiving the identification code from the wireless receiver and storing the identification code in a data record; and
    providing a digital camera, the digital camera communicatively coupled with the digital storage module, the digital camera for generating a digital image document when an optical field of the digital camera encompasses the operating region of the directional antenna of the wireless receiver and communicating the digital image document to the digital storage module, wherein the digital storage module stores the digital image document and associates the identification code with the digital image document.

2. The method of claim 1, wherein the transmission device automatically broadcasts the identification code.

3. The method of claim 1, wherein the transmission device broadcasts are initiated by the subject.

4. The method of claim 1, wherein the digital storage module is communicatively coupled with the Internet, and where at least one identification code and an associated digital image document are uploaded from the digital storage module to an Internet accessible data base.

5. The method of claim 1, wherein the digital image document is generated within one minute of receipt of the identification code by the wireless receiver.

6. The method of claim 2, wherein the digital image document and the identification code are stored in a digital media.

7. The method of claim 4, wherein the digital image document is accessed from the Internet accessible data base by reference to the identification code.

8. The method of claim 7, wherein an access to the digital image document is purchased via the Internet.

9. The method of claim 5, wherein the digital media is communicatively coupled with a digital media reader, and the digital media is accessed via the digital media reader.

10. The method of claim 1, wherein the wireless transmitter is communicatively coupled with a time/date stamp module and a time/date stamp is generated by the time/date stamp module and the time/date stamp is broadcast by the wireless transmitter to the wireless receiver.

11. The method of claim 1, wherein the wireless transmitter is communicatively coupled with a GPS module and a GPS information is generated by the GPS and the GPS information is broadcast by the wireless transmitter to the wireless receiver.

12. A system for generating and storing a digital image document, the system comprising:
    a portable radio wave wireless transmitter configured for transmitting an identification code;
    a wireless receiver comprising a directional antenna and configured to receive the identification code from the wireless transmitter, when the wireless transmitter is located within an operating region of the wireless antenna;
    a digital storage module communicatively coupled with the wireless receiver and configured for receiving the identification code from wireless receiver and storing the identification code; and
    a digital camera communicatively coupled with the digital storage module, the digital camera configured for generating a digital image document when an optical field of the digital camera encompasses the operating region of the directional antenna of the wireless receiver and providing the digital image document to the digital storage module, wherein the digital storage module stores the digital image document and associates the digital image document with the identification code.

13. The system of claim 12, wherein the identification code is stored as an attribute of the digital image document.

14. The system of claim 12, wherein the portable wireless transmitter is encased in a water resistant housing.

15. The system of claim 12, wherein the digital storage module is communicatively coupled with the Internet, whereby the digital image document is accessible via the Internet.

16. The system of claim 12, wherein the digital storage module is communicatively coupled with a telephony system, whereby the digital image document is accessible via the telephony system.

17. The system of claim 12, wherein the wireless transmitter and the wireless receiver are configured to communicate the identification code over greater than 20 feet.

18. The system of claim 12, wherein the wireless transmitter and the wireless receiver are configured to communicate the identification code over greater than 100 feet.

19. The system of claim 12, wherein the wireless transmitter and the wireless receiver are configured to communicate the identification code over greater than 1,000 feet.

* * * * *